(12) United States Patent
Baumann et al.

(10) Patent No.: US 11,491,585 B2
(45) Date of Patent: Nov. 8, 2022

(54) ALUMINUM MATERIAL FOR FLUXFREE CAB BRAZING

(71) Applicant: ARCONIC TECHNOLOGIES LLC, Pittsburgh, PA (US)

(72) Inventors: Stephen F. Baumann, Lancaster, PA (US); Michael P. Danz, Lancaster, PA (US); Ning Sun, Framingham, MA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 303 days.

(21) Appl. No.: 16/471,270

(22) PCT Filed: Jan. 24, 2018

(86) PCT No.: PCT/US2018/015006
§ 371 (c)(1),
(2) Date: Jun. 19, 2019

(87) PCT Pub. No.: WO2018/140468
PCT Pub. Date: Aug. 2, 2018

(65) Prior Publication Data
US 2020/0086429 A1     Mar. 19, 2020

Related U.S. Application Data

(60) Provisional application No. 62/452,090, filed on Jan. 30, 2017.

(51) Int. Cl.
*B23K 35/28*     (2006.01)
*B23K 35/02*     (2006.01)
(Continued)

(52) U.S. Cl.
CPC ........ *B23K 35/0238* (2013.01); *B23K 1/0012* (2013.01); *B23K 35/286* (2013.01);
(Continued)

(58) Field of Classification Search
None
See application file for complete search history.

(56) References Cited

U.S. PATENT DOCUMENTS 7,255,932 B1 *    8/2007    Kilmer ................. B23K 35/002
                                               428/654
8,763,880 B2      7/2014    Wittebrod
(Continued)

FOREIGN PATENT DOCUMENTS

EP        1306207 A1      5/2003
EP        1430988 B1     11/2013
(Continued)

OTHER PUBLICATIONS

International Search Report and Written Opinion issued by the Korean Intellectual Property Office dated Jun. 22, 2018 in international application No. PCT/US2018/015006 filed Jan. 24, 2018 (19 pages).
(Continued)

*Primary Examiner* — Daniel J. Schleis
(74) *Attorney, Agent, or Firm* — K&L Gates LLP (57) ABSTRACT

An aluminum alloy brazing sheet has a 3XXX, 1XXX or 6XXX core, an interliner and a 4XXX brazing layer without added Mg. The interliner has Bi and Mg, the magnesium migrating to the surface of the brazing sheet during brazing and reducing the aluminum oxide to facilitate brazing without flux in a controlled inert atmosphere with reduced oxygen.

19 Claims, 3 Drawing Sheets

(51) Int. Cl.
*B23K 1/00* (2006.01)
*B23K 35/38* (2006.01)
*C22C 21/08* (2006.01)
*F28F 21/08* (2006.01)
*B32B 15/01* (2006.01)
*B23K 103/10* (2006.01)
*B23K 101/14* (2006.01)

(52) U.S. Cl.
CPC .......... *B23K 35/383* (2013.01); *B32B 15/016* (2013.01); *C22C 21/08* (2013.01); *F28F 21/084* (2013.01); *F28F 21/089* (2013.01); *B23K 2101/14* (2018.08); *B23K 2103/10* (2018.08); *F28F 2275/04* (2013.01); *Y10T 428/12764* (2015.01)

(56) References Cited

U.S. PATENT DOCUMENTS

| | | | |
|---|---|---|---|
| 10,898,963 | B2 * | 1/2021 | Miyake ................ B23K 35/286 |
| 2003/0197050 | A1 | 10/2003 | Graham et al. |
| 2008/0274367 | A1 | 11/2008 | Kilmer et al. |
| 2010/0151273 | A1 | 6/2010 | Wittebrood |
| 2012/0177947 | A1 * | 7/2012 | Abrahamsson ....... B32B 15/016 428/654 |
| 2019/0337074 | A1 | 7/2019 | Miyaki |

FOREIGN PATENT DOCUMENTS

| | | |
|---|---|---|
| EP | 2855063 B1 | 3/2016 |
| JP | 6055573 B1 * | 12/2016 |
| JP | 6055573 B1 | 12/2016 |
| JP | 2017-18995 A | 1/2017 |
| WO | 2013180630 A1 | 12/2013 |

OTHER PUBLICATIONS

Extended European Search Report dated Apr. 28, 2020 for European Application No. 18744216.5.

* cited by examiner

ALUMINUM MATERIAL FOR FLUXFREE CAB BRAZING

CROSS-REFERENCE TO RELATED APPLICATIONS

This application is a 371 national phase of International Patent Application No. PCT/US2018/015006 filed 24 Jan. 2018, which claims the benefit of U.S. Provisional Application No. 62/452,090, filed 30 Jan. 2017, entitled, Aluminum Material for Fluxfree Cab Brazing, which is incorporated by reference herein in its entirety.

FIELD

The present invention relates to sheet metal and more particularly to sheet metal made from aluminum alloys that is used for joining operations in the fabrication of structures, such as heat exchangers and heat exchanger components, by controlled atmosphere brazing (CAB) without flux.

BACKGROUND

Brazing of metals is well known, wherein metal surfaces are brought into close proximity and heated in the presence of a filler metal, melting the filler metal, which flows into the interface between adjoining parts by capillary action and hardens upon cooling to join the metal parts. For brazing of aluminum parts to be successful, the surfaces to be joined and the filler metal need to be protected from oxidation during the various stages in the brazing process. Vacuum brazing is a furnace joining technology that protects the parts from oxidation by effectively removing most of the oxygen from the brazing chamber by a combination of evacuating the chamber and by use of oxygen getters such as Mg. The dominant method of furnace brazing today is Controlled Atmosphere Brazing (CAB) in which the parts are heated in a muffle furnace under a protective inert gas atmosphere (such as Nitrogen) with relatively low $O_2$ content. In CAB brazing, a flux is used to remove the oxide from the parts to be joined and to then protect the clean metal surfaces from oxidation by the residual $O_2$ in the furnace atmosphere. One such flux extensively used today is Nocolok™ flux. CAB brazing relies heavily upon flux to deal with the oxide on the parts and to control oxidation in the furnace but there are various reasons why it is desirable to avoid the use of flux in CAB brazing. These include concerns around environmental health and safety (EHS) and problems caused by the residual flux that remains on the part after brazing. This has driven efforts to develop materials that can be joined in a flux-free CAB brazing process.

International patent application publication No. WO 2013/180630 (also U.S. patent application Ser. No. 14/404, 093) describes a brazing sheet for fluxfree CAB brazing that comprises an aluminum alloy core material which is covered by an aluminum alloy interlayer comprising ≤1.0% Si, 0.1-2.5% Mg, the interlayer being covered by an Al—Si braze alloy comprising 5-14% Si, 0.01-1.0% Bi, <0.8% Fe, <6% Zn, <0.1% Sn, <0.1% In, <0.3% Cu, ≤0.15% Mn and <0.05% Sr. The core material and the interlayer material have a higher melting temperature than the braze alloy, e.g., the melting point of the interlayer and the core may be >615 C. The thickness of the interlayer may be 2.5% to 25% of the thickness of the sheet.

European Patent EP 1430988B1 describes a method of brazing on the inside hollow portion of a structure formed from aluminum alloy materials without applying flux. Brazing is done in an inert atmosphere and the sheet used to form the hollow structure has an aluminum alloy core clad with an Al—Si based brazing alloy on one or both sides with a thickness "a" microns. The core contains X % Mg (≥0.1% Mg) and the braze alloy contains Y % Mg with the respective composition of the two satisfying the relationship: (X+Y) ≤a/60+0.5 and X>Y. A 4-layer brazing sheet structure that incorporates a diffusion prevention layer between the core layer and the filler layer on the outer side of the formed hollow is also disclosed. Notwithstanding, alternative brazing methods and materials remain of interest.

SUMMARY

The disclosed subject matter relates to a sheet material for fluxfree CAB brazing, including: a core layer of 3XXX, 1XXX or 6XXX series aluminum alloy; an interliner layer having 0.25 to 1.7 wt % Mg, 0.3-1.1 wt % Si, 0.09-0.5 wt % Bi, and aluminum; a brazing liner layer of 4XXX aluminum alloy, wherein the interliner layer is disposed between the core layer and the brazing liner layer, the core layer, the interliner layer and the brazing liner layer conjoined together forming the sheet material.

In another embodiment, the interliner layer further includes up to 1.8 wt % Mn, up to 0.9 wt % Cu, up to 0.7 wt % Fe, up to 0.18 wt % Ti, up to 3.0 wt % Zn, up to 0.25 wt % Cr, and up to 0.15 wt % Zr.

In another embodiment, the brazing liner layer has a composition of Mg≤0.05 wt %.

In another embodiment, the brazing liner layer has a composition of Bi<0.010 wt %.

In another embodiment, the core layer has 0.08-1.1 wt % Si, 0.15 to 0.7 wt % Fe, 0.05-1.0 wt % Cu, 0.4-1.8 wt % Mn, up to 0.5 wt % Mg, up to 2 wt % Zn, up to 0.25 wt % Cr, and up to 0.15 wt % Zr.

In another embodiment, the braze liner layer has 5-12 wt % Si, up to 0.7 wt % Fe, up to 3 wt % Zn, aluminum and incidental impurities.

In another embodiment, the core has from 60% to 90% of a total thickness of the sheet material, the interliner layer from 3% to 20% of the total thickness and the braze liner layer from 3% to 20% of the total thickness.

In another embodiment, the interliner layer is a first interliner layer and further including a second interliner layer having a composition like that of the first interliner layer, the second interliner layer being disposed on the core opposite to the first interliner layer.

In another embodiment, the brazing liner layer is a first brazing liner layer and further including a second brazing liner layer disposed over the second interliner layer distal to the core.

In another embodiment, an additional aluminum alloy layer is disposed on the core opposite the interliner layer, wherein the additional alloy layer is a 3XXX alloy, a 3XXX+Zn alloy, a 1XXX alloy, a 7XXX alloy or a 4XXX alloy.

In another embodiment, a structure includes: a first part made from aluminum; a second part made from the sheet material described above, the first part and the second part joined together by a brazed joint at least partially formed from the brazing liner layer of the second part.

In another embodiment, the structure is a portion of a heat exchanger such as an oil cooler or radiator.

In another embodiment, the heat exchanger has an internal hollow devoid of flux residue.

In another embodiment, the Mg present in the interliner layer composition is from 0.25 to 0.95 wt %.

In another embodiment, the Mg present in the interliner layer composition is from 1.0 to 1.7 wt %.

In another embodiment, the Si present in the interliner layer composition is from 0.3 to 0.65 wt %.

In another embodiment, the Si present in the interliner layer composition is from 0.7 to 1.1 wt %.

In another embodiment, the Bi present in the interliner layer composition is from 0.05 to 0.20 wt %.

In another embodiment, the Bi present in the interliner layer composition is from 0.25 to 0.50 wt %.

In another embodiment, a method for brazing, includes: providing a first aluminum alloy material; providing a second aluminum alloy material having a core layer of 3XXX, 1XXX or 6XXX series aluminum alloy, an interliner layer having 0.25 to 1.7 wt % Mg, 0.3-1.1 wt % Si, 0.09-0.5 wt % Bi, aluminum, and a brazing liner layer of a 4XXX aluminum alloy with less than 0.05% Mg and less than 0.010% Bi, wherein the interliner layer is disposed between the core layer and the brazing liner layer, the core layer, the interliner layer and the brazing liner layer being conjoined to form the sheet material; bringing the first material into contact with the second material, with the brazing liner layer of the second sheet facing the first sheet; brazing the first material to the second material in an inert atmosphere brazing furnace without using flux.

In another embodiment, the step of brazing is conducted in a controlled atmosphere where an oxygen level is reduced to a level in the range of 1 ppm to about 35 ppm.

In another embodiment, the first aluminum alloy material has the same composition as the second aluminum alloy material.

In another embodiment, a sheet material has: a core layer of 3XXX series aluminum alloy; an interliner layer of 0.25 to 1.7 wt % Mg, 0.3-1.1 wt % Si, 0.09-0.5 wt % Bi, up to 1.8 wt % Mn, up to 0.9 wt % Cu, up to 0.7 wt % Fe, up to 0.18 wt % Ti, up to 3.0 wt % Zn, up to 0.25 wt % Cr, and up to 0.15 wt % Zr, remainder aluminum and impurities; a brazing liner layer of 4XXX aluminum alloy, wherein the interliner layer is disposed between the core layer and the brazing liner layer, the core layer, the interliner layer and the brazing liner layer conjoined together forming the sheet material.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

Figure 1:
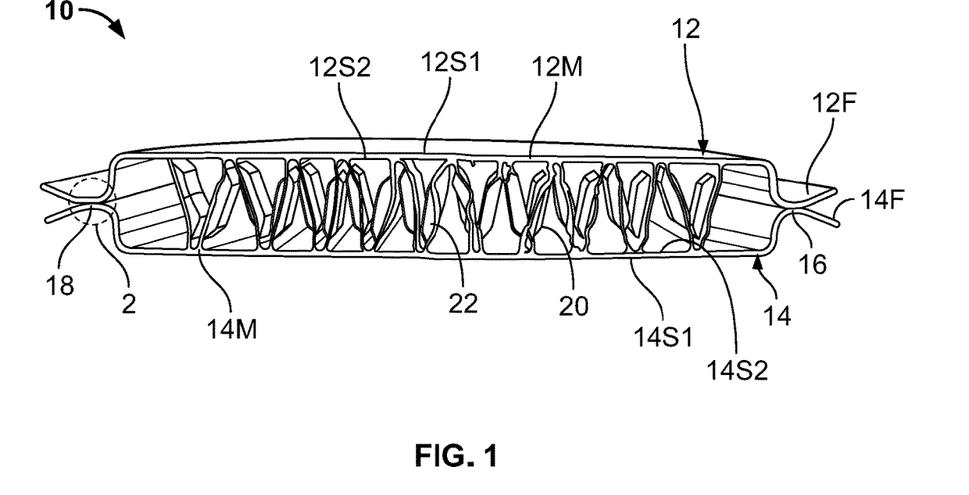
FIG. 1 is a cross-section of a brazed structure in accordance with an exemplary embodiment of the present disclosure.

FIG. 1 shows a cross-section of a brazed structure 10 having a pair of opposed shallow drawn cup members 12, 14 formed from sheet metal 12M, 14M, such as an aluminum alloy, that are brazed along a circular seam formed along the mating rails of the cups that is shown at joints 16, 18 to form the structure 10 with internal hollow 20. While FIG. 1 shows two joints 16, 18, these are different areas of a single continuous joint between the members 12, 14. In the exemplary structure 10 shown, the members 12, 14 are symmetrical and similar in shape, such that the sheet metal 12M, 14M may be of the same composition and gauge. In other applications, e.g., in joining a tube structure to a sheet metal header (not shown) the sheet metal of the header would have a different structural shape and may be of a different composition and/or gauge. A plurality of fins 22 are attached to the opposed members 12, 14, e.g., by brazing, and extend across the hollow 20. Since the members 12, 14 are cup-shaped in cross-section, they may be called "cups" and the overall structure 10 denominated a "cup/cup structure." The peripheral flange portions 12F, 14F of the members 12, 14 that are brazed together at joints 16, 18 may be denominated "rails." This particular sample geometry was used as a convenient tool for material evaluation during product development.

In commercial application this product would potentially be used to create a tubeplate structure that could be used in a stacked plate oil cooler or as a tubular structure, for instance, as a tube in an automotive radiator. The test structure 10 is merely one very simple example of a structure that can be formed by brazing sheet metal in accordance with the present disclosure. The sheet metal 12M, 14M of each member 12, 14 has two surfaces 12S1, 12S2 and 14S1, 14S2, respectively. In the structure 10 shown, 12S1, 14S1 form surfaces external to the hollow 20 and 12S2, 14S2 form internal surfaces, with 12S2 and 14S2 forming brazing junctions 16, 18 with each other and with the fins 22. For this reason, the surfaces 12S2, 14S2 that are intended to form brazing junctions may have a specific composition to support brazing. In another alternative, the surfaces 12S1 and/or 14S1 may also be intended to braze to another element, such as an adjacent tube, external fins or a collector tank (not shown) and may also be specialized for brazing.

Figure 2:
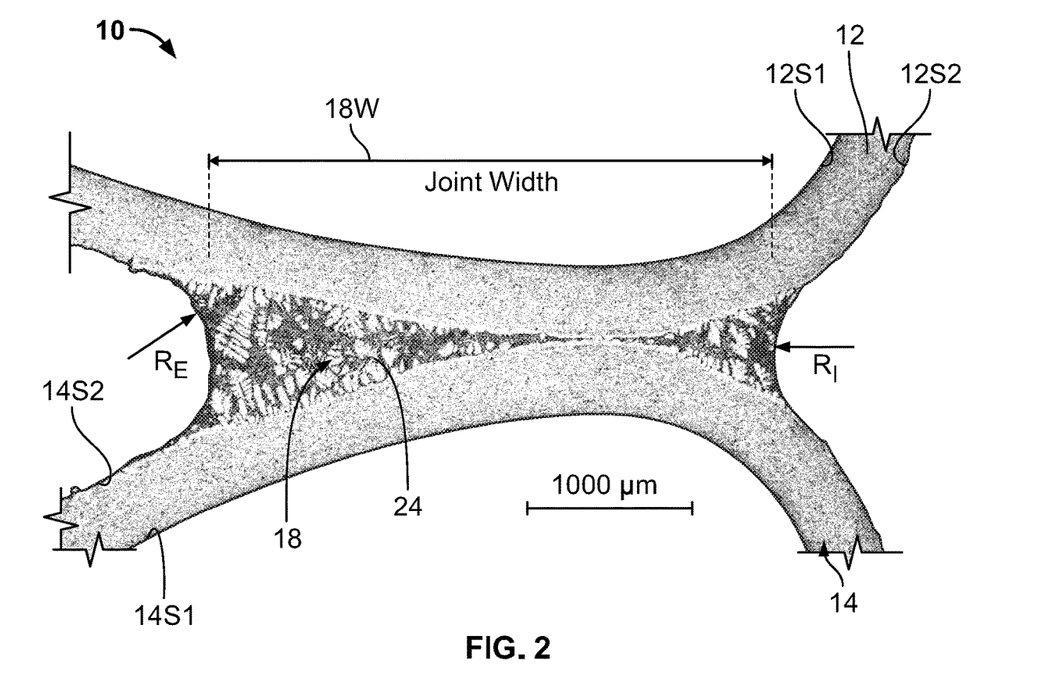
FIG. 2 is an enlarged fragment indicated by circle labeled 2 of FIG. 1.

FIG. 2 shows an enlarged fragment of structure 10 wherein the filler metal 24 making the joint 18 is visible bridging between members 12, 14. Where the members 12, 14 diverge on either side of the joint 18, the equilibrium between the self-attraction of the filler metal 24 in the liquid state and the attraction of the filler metal to the surfaces 12S2 and 14S2 draws the filler metal into radii RE (radius external to the hollow 20) and RI (radius internal to the hollow 20). These radii are one quantifiable measure of the effectiveness of the joint. Another quantifiable measure of joint quality is the width of the joint 18W. As will be explained below, the members 12, 14 are provided in a pre-braze state with discrete layers having different composition and including a braze liner layer on surfaces 12S2, 14S2 that melts and contributes the filler metal 24 to the joint 18.

Figure 3:
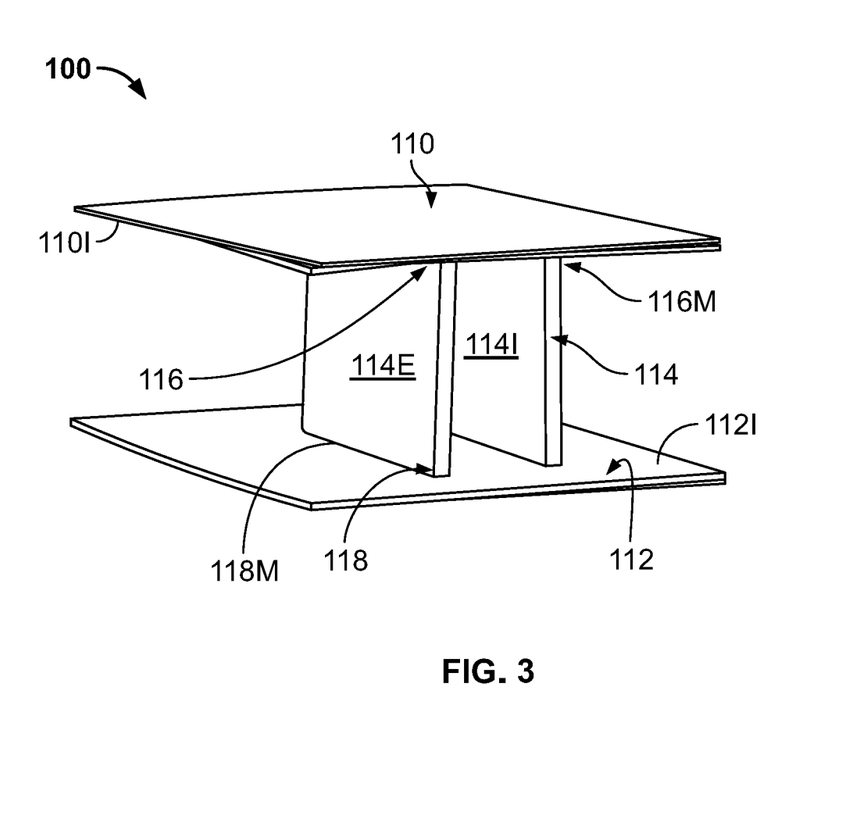
FIG. 3 is a perspective view of a brazed structure in accordance with an exemplary embodiment of the present disclosure.

FIG. 3 shows a structure 100, having end plates 110, 112 brazed to a U-shaped intermediate member 114 at joints 116, 118. The brazed joints 116, 118 have filler metal 116M, 118M that "wets" the interior and exterior surfaces 114I, 114E of the intermediate member 114, and the terminal ends thereof (at joints 116 and 118) in contact with members 110 and 112 at the interior surfaces of 110 (not visible in this view) and 112, i.e., 112I. In structure 100, the surfaces 112I, and 110I were clad with the brazing liner that provided the filler metal for the joints. Optionally, one or more of surfaces 114E, 114I and the surface of member 110 in contact with intermediate member 114 could be provided with a brazing liner, as described below in reference to FIG. 4.

Figure 4:
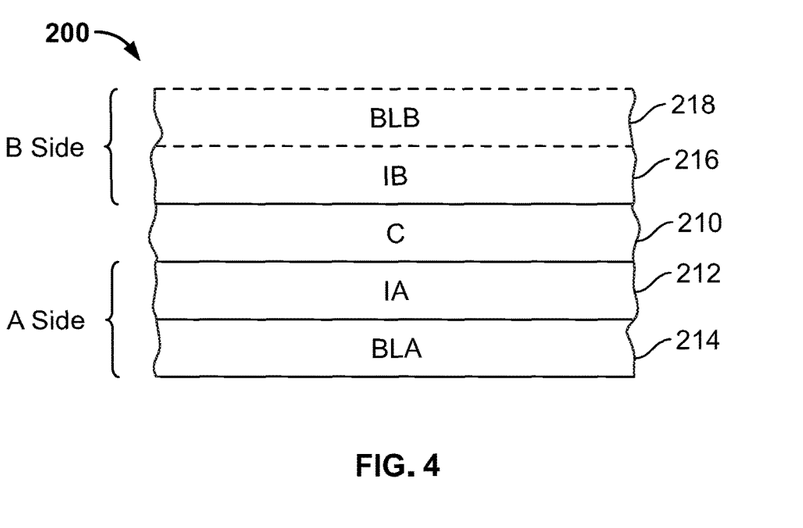
FIG. 4 is a diagrammatic view of a sheet material in accordance with the present disclosure.

FIG. 4 shows a metal sheet 200 with a plurality of layers 210, 212, 214, 216, 218 in accordance with the present disclosure that may be used as material for making structures, such as a cup structure 10 of FIG. 1, or any other structure that is formed by brazing a plurality of separate metal components, at least one of which is a component made from metal sheet 200. Sheet 200, since it is suitable for fabricating structures by brazing may be called a "brazing sheet" and may be used for fluxfree CAB brazing. A core 210 (also labeled "C") is typically comprised of a 3XXX-series aluminum alloy. An interliner layer 212 (also labeled "IA") is conjoined to the core 210. In one example, the interliner 212 is an aluminum alloy with 0.25% to 1.7 wt. % Mg, 0.3% to 1.1 wt. % Si and 0.09% to 0.5 wt. % Bi. The interliner 212 can further comprise up to 1.8% Mn, up to 0.9% Cu, up to 0.7% Fe, up to 3% Zn, up to 0.18% Ti, up to 0.20% Cr with the remainder being aluminum and incidental impurities. A braze liner 214 (also labeled "BLA") composed of a 4XXX-series alloy with typically 5% to 12% Si, up to 0.7% Fe and the remainder being aluminum and other incidental impurities is conjoined to the interliner 212 distal to the core 210. Up to 3% Zn can be incorporated into the 4XXX-series alloy of the braze liner 214. The core 210, interliner 212 and braze liner 214 layers may be conjoined by hot rolling the stack of layers, and then subsequently cold rolling and thermally treating the materials resulting in a final laminate structure with the desired internal structure and temper with a thickness in a range 0.100 mm to 4.0 mm, where the core comprises a percentage of the total thickness from 60% to 94%, the interliner 212 from 3 to 20% and the braze liner 214 from 3 to 20%.

In alternative embodiments in accordance with the present disclosure, the ranges given for the compositions of the interliners, cores and brazing liners, include all intermediary values. For example, for the interliner composition of aluminum alloy with 0.25% to 1.7 wt. % Mg, 0.3% to 1.1 wt. % Si and 0.09% to 0.5 wt. % Bi, remainder Al and impurities, the range of composition may include Mg in amounts of 0.25, 0.30, 0.35, 0.40, 0.45, 0.50, 0.55, 0.60, 0.65, 0.70, 0.75, 0.80, 0.85, 0.90, 0.95, 1.0, 1.05, 1.10, 1.15, 1.20, 1.25, 1.30, 1.35, 1.40, 1.45, 1.50, 1.55, 1.60, 1.65 or 1.7 wt % or any intermediate value, Si in amounts of 0.3, 0.35, 0.40, 0.45, 0.50, 0.55, 0.60, 0.65, 0.70, 0.75, 0.80, 0.85, 0.90, 0.95, 1.0 or 1.1 wt % or any intermediate value and Bi in amounts of 0.09, 0.10, 0.15, 0.20, 0.25, 0.30, 0.35, 0.40, 0.45 or 0.50 wt % or any intermediate values.

In a further example of alternative embodiments in accordance with the present disclosure, for an interliner 212 that further comprises up to 1.8% Mn, up to 0.9% Cu, up to 0.7% Fe, up to 3% Zn, up to 0.18% Ti, up to 0.20% Cr with the remainder being aluminum and incidental impurities, these compositional ranges may include Mn in amounts of 0.0, 0.1, 0.2, 0.3, 0.4, 0.5, 0.6, 0.7, 0.8, 0.9, 1.0, 1.1, 1.2, 1.3, 1.4, 1.5, 1.6, 1.7 or 1.8 wt % or any intermediate value, Cu in amounts of 0.0, 0.1, 0.2, 0.3, 0.4, 0.5, 0.6, 0.7, 0.8 or 0.9 wt % or any intermediate value, Fe in amounts of 0.0, 0.1, 0.2, 0.3, 0.4, 0.5, 0.6 or 0.7 wt % or any intermediate value, Zn in amounts of 0.0, 0.5, 1.0, 1.5, 2.0, 2.5 or 3.0 wt % or any intermediate value, Ti in amounts of 0.0, 0.01, 0.02, 0.03, 0.04, 0.05, 0.06, 0.07, 0.08, 0.09, 0.10, 0.11, 0.12, 0.13, 0.14, 0.15, 0.16, 0.17 or 0.18 wt % or any intermediate value and Cr in amounts of 0.0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19 or 0.20 wt % or any intermediate value.

In a further example of alternative embodiments in accordance with the present disclosure, a braze liner 214 composed of a 4XXX-series alloy with typically 5% to 12% Si, up to 0.7% Fe, up to 3.0 wt % Zn and the remainder being aluminum and other incidental impurities, may include Si in amounts of 5.0, 5.5, 6.0, 6.5, 7.0, 7.5, 8.0, 8.5, 9.0, 9.5, 10.0, 10.5, 11.0, 11.5 or 12.0 wt % or any intermediate value, Fe in an amount of 0.0, 0.1, 0.2, 0.3, 0.4, 0.5, 0.6 or 0.7 wt % or any intermediate value, and Zn in amounts of 0.0, 0.5, 1.0, 1.5, 2.0, 2.5 or 3.0 wt % or any intermediate value.

As described above, a brazing sheet, such as sheet 200 may be anticipated to braze to an adjacent structure on one or both sides. Sheet 200 shows optional interliner layer 216 and braze liner layer 218 in dotted lines and labeled "IB" and "BLB" to signify the optional nature of these layers, which would be provided in the event that the sheet is intended to braze on the side with these optional layers. The core 210 and layers 212 (IA), 214 (BLA) can be denominated the "A Side" of the sheet 200, with core 210 and layers 216 (IB), 218 (BLB) forming the "B Side" of the sheet 200. Alternately the optional layer IB and BLB can be replaced with another aluminum alloy layer or layers designed to give specific performance attributes to that surface after brazing, such as corrosion resistance. For instance, they could be replaced with another 3XXX layer, a 3XXX+Zn layer, a 1XXX layer, a 7XXX layer or a 4XXX layer.

Figure 5:
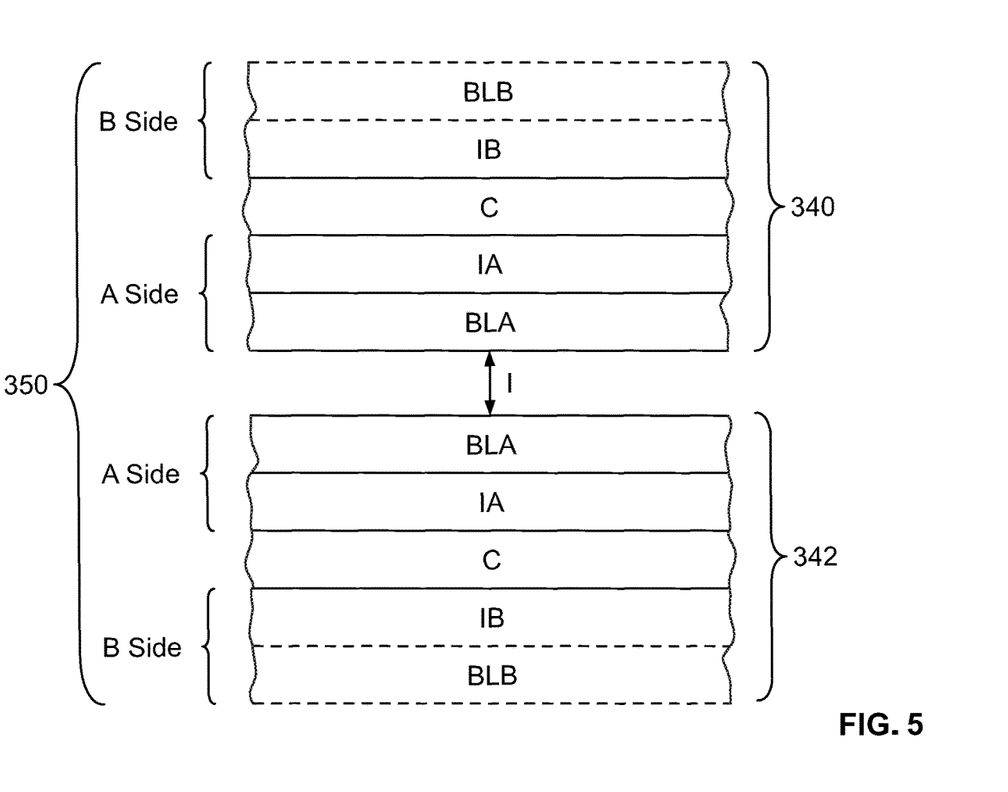
FIG. 5 is a diagrammatic view of a sheet material in accordance with the present disclosure positioned proximate another sheet material in accordance with the present disclosure prior to brazing.

FIG. 5 illustrates two brazing sheets 340, 342 positioned proximate one another with the A sides of each facing one another at interface I prior to brazing. Upon being placed in a CAB furnace with low ambient Oxygen levels and subjected to heating, the opposing braze liner layers BLA of sheets 340, 342 will melt and conjoin forming a conjunction at the interface I that binds the sheets 340, 342 into a structure 350 upon solidification. Optionally, the sheets 340, 342 could be oriented with the A Side of one sheet, e.g., 340 facing the B Side of the other sheet, e.g., 342. As a further option, the B Side braze liner layer 218 (FIG. 4) and/or the B Side interliner layer 216 layer may not be present on one or both of the sheets 340, 342, such that the braze liner 214 of one sheet is positioned next to the B-Side interliner layer 216 or the core layer 210 of the other sheet prior to brazing. As a further alternative, the A Side of one of the sheets, e.g. 340, with or without the B Side, may be positioned proximate another metal structure that does not have the layer structure and/or composition of the sheet 200 (FIG. 4) and brazed thereto. That is to say that the A Side or B Side (if present) of the sheet material 200 disclosed in the present application can be brazed to another piece of sheet material 200, either on the A Side or B Side (if present) as defined in the present disclosure or to other materials that are not described herein.

The core layer 210 is most typically a 3XXX-series aluminum alloy. The composition of the core alloy is not particularly restrictive. A broad range of 3XXX core alloys are possible. Allowable compositions of the 3XXX core alloy include 0.08 to 1.1 wt % Si, 0.15 to 0.7 wt % Fe, 0.05 to 1.0 wt % Cu, 0.4% to 1.8 wt % Mn, up to 0.5 wt % Mg, up to 2 wt % Zn, up to 0.25 wt % Cr, up to 0.15 wt % Zr. As described above relative to the interliner, the compositional amounts of alternative embodiments of the core can vary incrementally over the compositional range for each element. It is noted that other core alloys can be effective in this structure. If strength is not critical, then 1XXX alloys can be used. For some applications requiring high strength, 6XXX alloys could be utilized as core alloys.

The interliner layer(s) 212, 216 that help promote fluxfree brazing contain Mg which will diffuse to the surface of the sheet through the molten filler metal and reduce the aluminum oxide at the surface. The Mg content of the interliner alloy is between 0.25 wt % and 1.7 wt %. If below 0.25 wt % Mg there is insufficient Mg to promote brazing, but above 1.7% Mg there is no additional benefit recognized. Si is also an important component of the interliner(s) 212, 216 because it helps control their solidus temperature. The Si content of the interliner(s) 212, 216 is between 0.3 wt % and 1.1 wt %. Bismuth is also an important component of the interliner because it helps promote wetting of the filler metal. If below about 0.09 wt % Bi its influence on brazing is not significant, but above about 0.5 wt % there is no additional benefit recognized. Other elements can be incorporated into the interliner alloy for the purpose of increasing post-braze strength or enhancing corrosion resistance. These elements include Mn up to 1.8 wt %, Cu up to 0.9 wt %, Fe up to 0.7 wt %, Ti up to 0.18 wt %, Zn up to 3 wt %, Cr up to 0.25 wt % and Zr up to 0.15 wt %. The interliner thickness can range from 3% to 20% of the thickness of the final composite.

The braze filler metals are typical CAB braze alloys such as AA4343, AA4045, AA4047 or the like with no intentional Mg or Bi addition. Up to 3 wt % Zn can be incorporated in the braze liners for purposes of providing corrosion protection to the final brazed product. The thickness of the braze liners can range from 3% to about 20% of the final composite thickness.

The present disclosure utilizes standard abbreviations for the elements that appear in the periodic table of elements, e.g., Mg (magnesium), O (oxygen), Si (silicon), Al (aluminum), Bi (bismuth), Fe (iron), Zn (zinc), In (indium), Cu (copper), Mn (manganese), Sr (strontium), Ti (titanium), Zr (zirconium), etc.

The figures constitute a part of this specification and include illustrative embodiments of the present disclosure and illustrate various objects and features thereof. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

Examples and Test Results

For ascertaining the efficacy of the sheet material 200 described above for promoting brazing, testing was conducted. There are two in-house tests that were conducted to measure the effectiveness of materials in fluxfree CAB brazing. The first is referred to as a cup/cup braze test in which two sheet metal structures having been stamped into shallow cup-shaped articles are brazed together in a CAB brazing. The brazing furnace used typically has about 50 ppm $O_2$ in the muffle atmosphere through the critical brazing temperature range (577° to 600° C.). FIG. 1 shows a cross-section of a typical cup/cup brazed sample structure 10. To evaluate the quality of the joints 16, 18 (actually a continuous peripheral joint), the perimeter rail/rail joints of these samples were sectioned in 5 or 6 different locations and various parameters of the braze joint were measured including the internal fillet radius (RI), external fillet radius (RE) and the joint width (See FIG. 2). In addition, the quality of the internal joints between the bare 3003 fins 22 and the interior surfaces 12S2, 14S2 of the cups were given qualitative ratings.

The second test involves fluxfree brazing a U-bend section 114, FIG. 3, of bare 3003 sheet to two pieces 110, 112 of the test material. FIG. 3 shows a representative brazed test piece structure 100. This brazing is done in a quartz furnace in which controlled amounts of Oxygen ($O_2$) can be introduced into the nitrogen ($N_2$) atmosphere. The quality of the joint is quantified by visual inspection and measuring the amount of good joint length relative to the amount of total possible joint length. The assumption is that "better quality" or more efficacious materials will be able to generate acceptable joints at higher levels of $O_2$ contamination than will "lesser quality" materials.

Some tests are described below which illustrate the brazing attributes of the invention material. Table 1 below lists the compositions of the core and interliner alloys used in this work. The braze liner in all cases is AA 4045 with composition limits described in the Teal Sheets of the Aluminum Association.

TABLE 1

Core and Interliner alloy compositions used in the Tests

| Element | Alloy ID | | | | | | | |
| --- | --- | --- | --- | --- | --- | --- | --- | --- |
|  | C1 | C2 | IA1 | IA2 | IA3 | IA4 | IA5 | IA6 |
| Si | 0.07 | 0.07 | 0.75 | 0.72 | 0.68 | 0.68 | 0.65 | 0.69 |
| Fe | 0.19 | 0.41 | 0.22 | 0.20 | 0.23 | 0.23 | 0.25 | 0.48 |
| Cu | 0.53 | 0.54 | 0.00 | 0.00 | 0.00 | 0.00 | 0.00 | 0.24 |
| Mn | 1.11 | 0.99 | 0.00 | 0.00 | 0.00 | 0.00 | 0.00 | 0.08 |
| Mg | 0.00 | 0.48 | 1.21 | 1.23 | 1.24 | 1.67 | 1.17 | 0.98 |
| Cr | 0.00 | 0.00 | 0.00 | 0.00 | 0.00 | 0.00 | 0.00 | 0.20 |
| Zn | 0.00 | 0.01 | 0.00 | 0.00. | 0.00 | 0.00 | 0.00 | 0.03 |
| Ti | 0.13 | 0.15 | 0.01 | 0.01 | 0.01 | 0.01 | 0.01 | 0.05 |
| Bi | 0.00 | 0.00 | 0.12 | 0.26 | 0.41 | 0.44 | 0.52 | 0.00 |

Test 1

In one set of tests various laboratory fabricated experimental materials were evaluated for brazing performance. The materials were all O-temper prior to brazing and are described in Table 2. The clad ratio for the braze liners and interliners are indicated as percentages of sheet thickness in parentheses.

TABLE 2

Materials in Test 1

| Test ID # | gauge | Liner A | Interliner A | Core | Interliner B | Liner B |
|---|---|---|---|---|---|---|
| 13-242-2 | 0.5 mm | AA 4045 (15%) | | C1 | | |
| 14-157-3 | 0.43 mm | AA 4045 (10%) | | C1 | | AA 4045 (10%) |
| 15-128-2 | 0.43 mm | AA 4045 (12.5%) | IA1 (5%) | C1 | IA1 (5%) | AA 4045 (12.5%) |

Cup/cup samples were brazed in a CAB furnace using each of the above materials. For the first two materials cup/cup samples were brazed with and without flux. Table 3 reports the average fillet dimensions measured for each of the materials.

TABLE 3

Rail/rail fillet results from Test 1

| ID # | $R_I$ (microns) | $R_E$ (microns) | Fillet width (microns) | Fin/cup joints |
|---|---|---|---|---|
| 13-242-2 | No joint | No joint | No joint | No joints |
| 13-242-2-fluxed | 548 | 581 | 3451 | Good joints |
| 14-157-3 | No joint | No joint | No joint | No joints |
| 14-157-3-fluxed | 403 | 376 | 3242 | Good joints |
| 15-128-2 | 682-911 | 75-203 | 1816-2831 | Good joints |

From Table 3 we can see that in standard CAB brazing (with flux) the $R_I$ and $R_E$ are roughly equivalent and both are sizeable fillet radii and the joint width for this geometry sample is in the 3000-3500 micron range. These fillet dimensions represent the "target" that we would like to approach, but without the use of flux. Without flux, the Mg-free materials 13-242-2 and 14-157-3 do not support joint formation. With material 15-128-2, where Mg, Si and Bi are incorporated into an interliner between the core and braze liner, the internal fin/cup joints are good, $R_I$ is good while $R_E$ and fillet width, though still smaller than for the fluxed joints, are better than for the materials without the interliner.

Test 2

A second test was conducted with the laboratory fabricated O-temper materials listed in Table 4. Four of these are asymmetric composite materials.

TABLE 4

Materials in Test 2

| ID # | gauge | Liner A | Interliner A | Core | Interliner B | Liner B |
|---|---|---|---|---|---|---|
| 14-120-3 | 0.43 mm | AA 4045 (15%) | IA6 (8%) | C1 | IA6 (8%) | AA 4045 (15%) |
| 15-165-2 | 0.43 mm | AA 4045 (15%) | IA1 (7.5%) | C1 | IA1 (7.5%) | AA 4045 (7.5%) |
| 15-166-2 | 0.43 mm | AA 4045 (12.5%) | IA1 (15%) | C1 | IA1 (10%) | AA 4045 (12.5%) |
| 15-187-2 | 0.43 mm | AA 4045 (12.5%) | IA2 (10%) | C1 | IA5 (10%) | AA 4045 (12.5%) |
| 15-188-2 | 0.43 mm | AA 4045 (12.5%) | IA3 (10%) | C1 | IA4 (10%) | AA 4045 (12.5%) |

In all cases, when stamping and brazing cups from the asymmetric materials we brazed side A against side A or Side B against Side B. The results of the cup/cup brazing tests are shown in Table 5.

TABLE 5

Rail/rail fillet results from Test 2

| ID # | side | $R_I$ (microns) | $R_E$ (microns) | Fillet width (microns) | Fin/cup joints |
|---|---|---|---|---|---|
| 14-120-3 | | 111-455 | 32-54 | 588-1405 | Fairly Good joints |
| 15-165-2 | A | 774-796 | 244-258 | 2832-3059 | Good joints |
| 15-165-2 | B | 432-450 | 78-84 | 1705-1745 | Good joints |
| 15-166-2 | A | 727-728 | 170-195 | 2331-2500 | Good joints |
| 15-166-2 | B | 682-782 | 161-238 | 2326-2469 | Good joints |
| 15-187-2 | A | 539-630 | 75-90 | 1779-1940 | Good joints |
| 15-187-2 | B | 675-678 | 82-107 | 1884-2243 | Good joints |
| 15-188-2 | A | 597-601 | 99-100 | 2041-2233 | Good joints |
| 15-188-2 | B | 548-617 | 75 | 1927-1929 | Good joints |

From Table 5 we see that the material that incorporated interliners without Bi (14-120-3) gave notably smaller fillet radii and fillet length despite having a high clad ratio of filler metal. The other materials which all incorporate Mg, Si and Bi in the interliners produced better fillets.

Test 3

A third test was conducted with laboratory fabricated O-temper materials listed in Table 6.

TABLE 6

Materials in Test 3

| ID # | gauge | Liner A | Interliner A | Core | Interliner B | Liner B |
|---|---|---|---|---|---|---|
| 15-075-2 | 0.43 mm | AA 4045 (10%) | | C2 | | AA 4045 (10%) |
| 15-100-2 | 0.43 mm | AA 4045 (12.5%) | | C2 | | AA 4045 (12.5%) |
| 15-128-2 | 0.43 mm | AA 4045 (12.5%) | IA1 (5%) | C1 | IA1 (5%) | AA 4045 (12.5%) |
| 15-165-2 | 0.43 mm | AA 4045 (15%) | IA1 (5%) | C1 | IA1 (7.5%) | AA 4045 (7.5%) |
| 15-166-2 | 0.43 mm | AA 4045 (12.5%) | IA1 (15%) | C1 | IA1 (10%) | AA 4045 (12.5%) |

These materials were brazed to bare 3003 U-bend strips in the quartz furnace with various levels of $O_2$ in the otherwise $N_2$ atmosphere. The quality of the joint was assessed and quantified. The results are reported in Table 7. Blanks indicate tests were not run for that material/atmosphere combination.

TABLE 7

Quality of fillets in Test 3

| ID # | side | 2-3 ppm $O_2$ | 12 ppm $O_2$ | 16 ppm $O_2$ | 29 ppm $O_2$ |
|---|---|---|---|---|---|
| 15-075-2 | | 36%-47% | | | |
| 15-100-2 | | 38%-49% | 37% | | 20% |
| 15-128-2 | | 94% | | 51% | 44% |
| 15-165-2 | A | 100% | | 100% | 71%-89% |
| 15-166-2 | A | 97% | | 78% | 68%-73% |

The quality % ratings indicate the % of good joint formed. The rating has two parts. Part A is worth 20% and is simply determined by the length of joint between 3003 U-bend and the brazing sheet pieces. There is 80 mm of potential joint length so if there are no gaps between the U-bend and the sheets the Part A score is 20%. Part B is worth 80% and concentrates on the fillet radius along the joint. It is simply a ratio the length of good fillet radius divided by the total possible fillet radius length (160 mm). So if both top and bottom pieces are brazed to the U-bend and there is 130 mm of good fillet radius length, then the score is (80/80)*20%+ (130/160)*80%=85%. The data in Table 7 clearly shows the benefit of an Al—Mg—Si—Bi interliner positioned between a core and braze liner in promoting good joint formation without flux at low to moderate $O_2$ contents in an otherwise inert atmosphere.

A sheet material in accordance with the present disclosure may allow heat exchanger manufacturers to produce brazed heat exchangers with a high level of internal cleanliness to meet the demands of their customers, especially the automotive OEMs. While vacuum brazing is one way to generate very clean interior units, not all heat exchanger fabricators have vacuum brazing equipment. Most have CAB brazing furnaces and prefer to use them because of the ease of operation and maintenance. The flux commonly used in CAB brazing however results in residues that are present throughout the heat exchanger after brazing. Levels of flux residue that are considered acceptable are being reduced for many mass produced heat exchangers. It is therefore desirable to have a material that will braze in an inert furnace atmosphere without the need for flux. Elimination of flux also represents a cost savings and increased cleanliness of the brazing furnace area by eliminating the fluxing operation, reduced maintenance time of the brazer muffle, belt and fixtures. A sheet material in accordance with the present disclosure may also lead to decreased EHS issues since flux may represent a health concerns as a fine particulate material that can be inhaled.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated). All such variations and modifications are intended to be included within the scope of the claims.

We claim:

1. A sheet material for fluxfree CAB brazing, the sheet material comprising:
   a core layer comprised of 3XXX, 1XXX or 6XXX series aluminum alloy;
   an interliner layer comprised of 0.25 to 1.7 wt % Mg, 0.3-0.95 wt % Si, 0.09-0.5 wt % Bi, and aluminum; and
   a brazing liner layer comprised of 4XXX aluminum alloy, wherein the interliner layer is disposed between the core layer and the brazing liner layer, and the core layer, the interliner layer and the brazing liner layer are conjoined together forming the sheet material.

2. The sheet material of claim 1, wherein the interliner layer further comprises up to 1.8 wt % Mn, up to 0.9 wt % Cu, up to 0.7 wt % Fe, up to 0.18 wt % Ti, up to 3.0 wt % Zn, up to 0.25 wt % Cr, and up to 0.15 wt % Zr.

3. The sheet material of claim 1, wherein the brazing liner layer has a composition of Mg<0.05wt %.

4. The sheet material of claim 1, wherein the brazing liner layer has a composition of Bi<0.010 wt %.

5. The sheet material of claim 1, wherein the core layer comprises 0.08-1.1 wt % Si, 0.15 to 0.7 wt % Fe, 0.05-1.0 wt % Cu, 0.4-1.8 wt % Mn, up to 0.5 wt % Mg, up to 2 wt % Zn, up to 0.25 wt % Cr, and up to 0.15 wt % Zr.

6. The sheet material of claim 1, wherein the brazing liner layer comprises 5-12 wt % Si, up to 0.7 wt % Fe, up to 3 wt % Zn, aluminum and incidental impurities.

7. The sheet material of claim 1, wherein the core layer comprises from 60% to 90% of a total thickness of the sheet material, the interliner layer comprises from 3% to 20% of the total thickness and the brazing liner layer comprises from 3% to 20% of the total thickness.

8. The sheet material of claim 1, wherein the interliner layer is a first interliner layer and further comprising a second interliner layer having a composition like that of the first interliner layer, the second interliner layer being disposed on the core layer opposite to the first interliner layer.

9. The sheet material of claim 8, wherein the brazing liner layer is a first brazing liner layer and further comprising a second brazing liner layer disposed over the second interliner layer distal to the core layer.

10. The sheet material of claim 1 further comprising an additional aluminum alloy layer disposed on the core layer opposite the interliner layer, wherein the additional aluminum alloy layer is comprised of at least one alloy selected from the group consisting of a 3XXX alloy, a 3XXX+Zn alloy, a 1XXX alloy, a 7XXX alloy and a 4XXX alloy.

11. The sheet material of claim 1, wherein the sheet material is formed into a first part and further comprising a second part made from aluminum alloy, the first part and the second part joined together by a brazed joint at least partially formed from the brazing liner layer of the first part.

12. The sheet material of claim 11, wherein the sheet material is a portion of a heat exchanger such as an oil cooler or radiator.

13. The sheet material of claim 12, wherein the heat exchanger has an internal hollow devoid of flux residue.

14. The sheet material of claim 1, wherein the Mg present in the interliner layer is from 0.25 to 0.95 wt %.

15. The sheet material of claim 1, wherein the Mg present in the interliner layer is from 1.0 to 1.7 wt %.

16. The sheet material of claim 1, wherein the Si present in the interliner layer is from 0.3 to 0.65 wt %.

17. The sheet material of claim 1, wherein the Si present in the interliner layer is from 0.7 to 0.95 wt %.

18. The sheet material of claim 1, wherein the Bi present in the interliner layer is from 0.09 to 0.24 wt %.

19. The sheet material of claim 1, wherein the Bi present in the interliner layer is from 0.25 to 0.50 wt %.

* * * * *